(12) United States Patent
Tsunoda

(10) Patent No.: US 11,934,013 B2
(45) Date of Patent: Mar. 19, 2024

(54) OPTICAL ELEMENT AND OPTICAL TRANSMISSION SYSTEM

(71) Applicant: KYOCERA CORPORATION, Kyoto (JP)

(72) Inventor: Masatoshi Tsunoda, Machida (JP)

(73) Assignee: KYOCERA CORPORATION, Kyoto (JP)

(*) Notice: Subject to any disclaimer, the term of this patent is extended or adjusted under 35 U.S.C. 154(b) by 257 days.

(21) Appl. No.: 17/612,216

(22) PCT Filed: May 20, 2020

(86) PCT No.: PCT/JP2020/019920
§ 371 (c)(1),
(2) Date: Nov. 18, 2021

(87) PCT Pub. No.: WO2020/246242
PCT Pub. Date: Dec. 10, 2020

(65) Prior Publication Data
US 2022/0236498 A1    Jul. 28, 2022

(30) Foreign Application Priority Data
Jun. 7, 2019 (JP) ................................ 2019-106673

(51) Int. Cl.
*G02B 6/32* (2006.01)
*G02B 6/26* (2006.01)
*G02B 6/42* (2006.01)
*G02B 19/00* (2006.01)

(52) U.S. Cl.
CPC ............... *G02B 6/32* (2013.01); *G02B 6/262* (2013.01); *G02B 6/4206* (2013.01); *G02B 19/0009* (2013.01); *G02B 19/0033* (2013.01)

(58) Field of Classification Search
None
See application file for complete search history.

(56) References Cited

U.S. PATENT DOCUMENTS

| 4,422,733 A | * | 12/1983 | Kikuchi | ............... G02B 3/0087 359/652 |
| 4,732,448 A | * | 3/1988 | Goldenberg | ......... G02B 6/4296 606/7 |
| 5,461,692 A | * | 10/1995 | Nagel | ................ G02B 6/03627 385/38 |

(Continued)

FOREIGN PATENT DOCUMENTS

| JP | 2010135989 A | 6/2010 |
| JP | 2013225010 A | 10/2013 |

(Continued)

*Primary Examiner* — Jerry Rahll
(74) *Attorney, Agent, or Firm* — HAUPTMAN HAM, LLP

(57) ABSTRACT

An optical element includes a first condensing lens and a plurality of second condensing lenses. The optical element is disposed so as to face an end of an optical fiber. The optical fiber includes a core, a first cladding located around the core, and a second cladding located around the first cladding. The first condensing lens is disposed at a position corresponding to the core. The second condensing lenses are disposed around the first condensing lens at positions corresponding to the first cladding.

8 Claims, 4 Drawing Sheets

(56) References Cited

U.S. PATENT DOCUMENTS

| | | | |
|---|---|---|---|
| 6,904,199 B2* | 6/2005 | Zuluaga | G02B 6/262 |
| | | | 385/36 |
| 8,781,269 B2* | 7/2014 | Huber | G02B 6/03644 |
| | | | 385/18 |
| 9,405,123 B2* | 8/2016 | Watanabe | G02B 19/0014 |
| 10,234,632 B1* | 3/2019 | Keeler | G02B 6/3834 |
| 10,627,573 B2* | 4/2020 | Fujita | G02B 6/262 |
| 2003/0165292 A1* | 9/2003 | Bhagavatula | G02B 6/4203 |
| | | | 385/33 |
| 2004/0034290 A1* | 2/2004 | Zuluaga | A61B 5/0084 |
| | | | 385/33 |
| 2004/0114878 A1* | 6/2004 | Yamada | G11B 7/1384 |
| 2005/0218305 A1* | 10/2005 | Tsukamoto | G02B 6/43 |
| | | | 250/216 |
| 2013/0223792 A1* | 8/2013 | Huber | G02B 6/03644 |
| | | | 385/127 |
| 2015/0370019 A1* | 12/2015 | Watanabe | G02B 27/0922 |
| | | | 385/33 |
| 2016/0154182 A1* | 6/2016 | Noguchi | G02B 6/06 |
| | | | 385/96 |
| 2016/0346875 A1* | 12/2016 | Bruck | B23K 26/34 |
| 2018/0003859 A1* | 1/2018 | Morasse | G02B 6/02061 |
| 2022/0236487 A1* | 7/2022 | Tetsuka | G02B 6/28 |
| 2022/0236498 A1* | 7/2022 | Tsunoda | G02B 3/0056 |

FOREIGN PATENT DOCUMENTS

| | | | |
|---|---|---|---|
| JP | 20169070 A | 1/2016 | |
| WO | 2004104666 A1 | 12/2004 | |
| WO | 2013031563 A1 | 3/2013 | |

* cited by examiner

OPTICAL ELEMENT AND OPTICAL TRANSMISSION SYSTEM

RELATED APPLICATIONS

The present application is a National Phase of International Application No. PCT/JP2020/019920 filed May 20, 2020, and claims priority based on Japanese Patent Application No. 2019-106673 filed Jun. 7, 2019.

TECHNICAL FIELD

The present disclosure relates to an optical element and an optical transmission system.

BACKGROUND ART

There is disclosed in Patent Literature 1 an optical multiplexer/demultiplexer that separates light of a plurality of wavelengths transmitted through an optical fiber. In the optical multiplexer/demultiplexer of Patent Literature 1, in the middle of an optical path, an optical filter allows light of a first wavelength and light of a second wavelength to pass through and reflects light of a third wavelength, thereby transmitting light of a plurality of wavelengths to a plurality of cores.

CITATION LIST

Patent Literature

Patent Literature 1: JP 2013-225010 A

SUMMARY OF INVENTION

Problem to Solve

If light is transmitted through an optical fiber, it is desired that the light can be transmitted efficiently.

Solution to Problem

An optical element of the present disclosure includes:
a first condensing lens; and
a plurality of second condensing lenses,
wherein the optical element is disposed so as to face an end of an optical fiber including a core, a first cladding located around the core, and a second cladding located around the first cladding,
wherein the first condensing lens is disposed at a position corresponding to the core, and
wherein the second condensing lenses are disposed around the first condensing lens at positions corresponding to the first cladding.

An optical transmission system of the present disclosure includes:
an optical fiber including a core, a first cladding located around the core, and a second cladding located around the first cladding, signal light and feed light being transmitted through the optical fiber; and
the above optical element facing an output end of the optical fiber.

DESCRIPTION OF EMBODIMENTS

Figure 1:
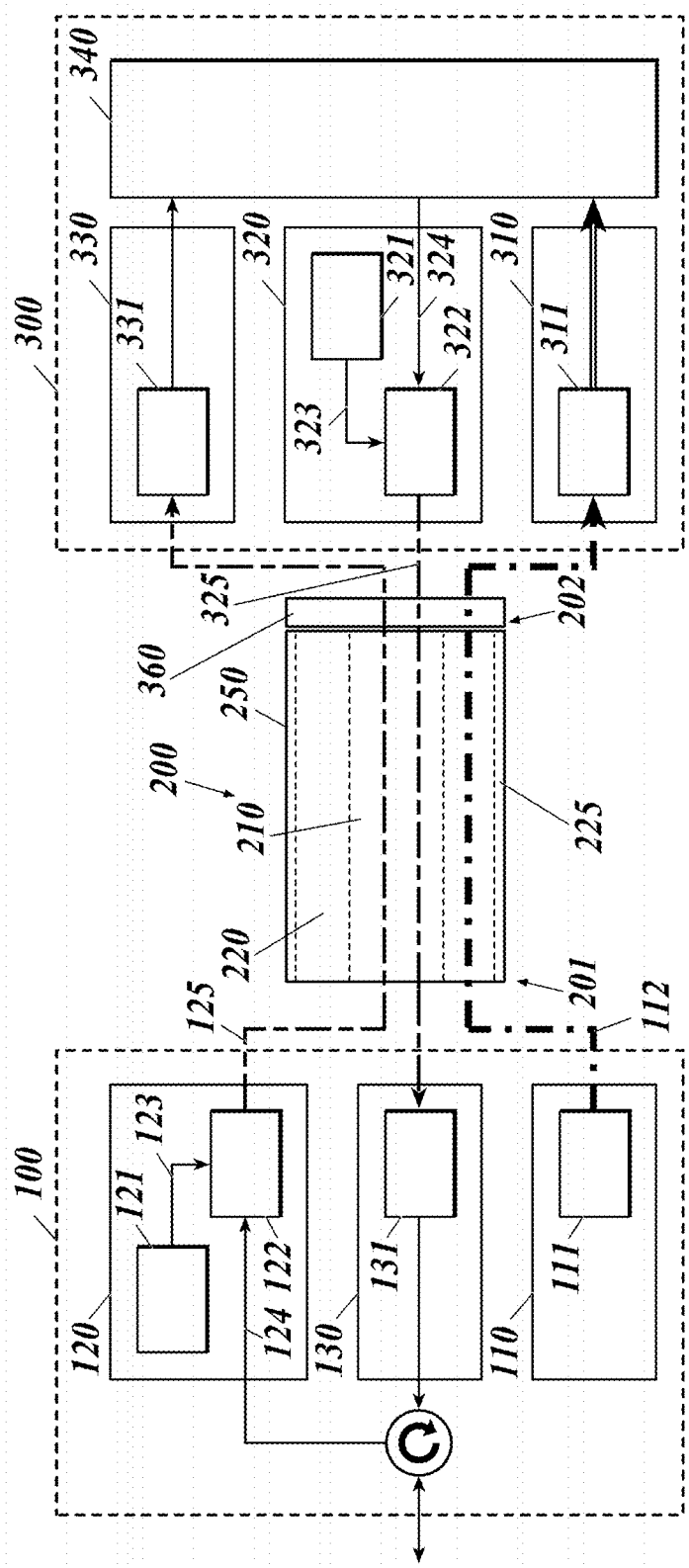
FIG. 1 is a block diagram of a power over fiber system of an embodiment(s).

Hereinafter, one or more embodiments of the present disclosure will be described in detail with reference to the drawings. FIG. 1 is a block diagram of a power over fiber system of an embodiment(s).

As shown in FIG. 1, a power over fiber (PoF) system 1 of this embodiment is an optical transmission system that performs power supply and optical communication through an optical fiber 250. The power over fiber system 1 includes: a first data communication device 100 including a power sourcing equipment (PSE) 110; an optical fiber cable 200; and a second data communication device 300 including a powered device (PD) 310. The power over fiber system 1 further includes an optical element 360. The optical element 360 may be included in the second data communication device 300.

The power sourcing equipment 110 includes a semiconductor laser 111 for power supply. The first data communication device 100 includes, in addition to the power sourcing equipment 110, a transmitter 120 and a receiver 130 for data communication. The first data communication device 100 corresponds to a data terminal equipment (DTE), a repeater or the like. The transmitter 120 includes a semiconductor laser 121 for signals and a modulator 122. The receiver 130 includes a photodiode 131 for signals.

The optical fiber cable 200 includes the optical fiber 250. The optical fiber 250 includes: a core 210 that forms a transmission path of signal light; a cladding 220 (corresponding to a first cladding) that is arranged around the core 210 and forms a transmission path of feed light; and an outer cladding 225 (corresponding to a second cladding) that is arranged around the cladding 220.

The powered device 310 includes a photoelectric conversion element 311. The second data communication device 300 includes, in addition to the powered device 310, a transmitter 320, a receiver 330 and a data processing unit 340. The second data communication device 300 corresponds to a power end station or the like. The transmitter 320 includes a semiconductor laser 321 for signals and a modulator 322. The receiver 330 includes a photodiode 331 for signals. The data processing unit 340 processes received signals. The second data communication device 300 is a node in a communication network. The second data communication device 300 may be a node that communicates with another node.

The first data communication device 100 is connected to a power source, and electrically drives the semiconductor laser 111, the semiconductor laser 121, the modulator 122, the photodiode 131 and so forth. The first data communication device 100 is a node in a communication network. The first data communication device 100 may be a node that communicates with another node.

The semiconductor laser 111 oscillates with the electric power from the power source, thereby outputting feed light 112.

The photoelectric conversion element 311 converts the feed light 112 transmitted through the optical fiber cable 200 into electric power. The electric power obtained by the conversion of the feed light 112 by the photoelectric conversion element 311 is driving power needed in the second data communication device 300, for example, driving power for the transmitter 320, the receiver 330 and the data processing unit 340. The second data communication device 300 may be capable of outputting, for an external device(s), the electric power obtained by the conversion of the feed light 112 by the photoelectric conversion element 311.

Semiconductor materials of semiconductor regions of the semiconductor laser 111 and the photoelectric conversion element 311 are semiconductors having a laser wavelength being a short wavelength of 500 nm or less. The semiconductor regions exhibit light-electricity conversion effect. Semiconductors having a laser wavelength being a short wavelength have a large band gap and a high photoelectric conversion efficiency, and hence improve photoelectric conversion efficiency at the power supplying side and the power receiving side in optical power supply, and improve optical power supply efficiency.

Hence, as the semiconductor materials, laser media having a laser wavelength (base wave) of 200 nm to 500 nm may be used. Examples thereof include diamond, gallium oxide, aluminum nitride and gallium nitride. Further, as the semiconductor materials, semiconductors having a band gap of 2.4 eV or greater are used. For example, laser media having a band gap of 2.4 eV to 6.2 eV may be used. Examples thereof include diamond, gallium oxide, aluminum nitride and gallium nitride.

Laser light having a longer wavelength tends to have a higher transmission efficiency, whereas laser light having a shorter wavelength tends to have a higher photoelectric conversion efficiency. Hence, when laser light is transmitted for a long distance, laser media having a laser wavelength (base wave) of greater than 500 nm may be used as the semiconductor materials, whereas when the photoelectric conversion efficiency is given priority, laser media having a laser wavelength (base wave) of less than 200 nm may be used as the semiconductor materials.

Any of these semiconductor materials may be used in one of the semiconductor laser 111 and the photoelectric conversion element 311. This improves the photoelectric conversion efficiency at either the power supplying side or the power receiving side, and improves the optical power supply efficiency.

The modulator 122 of the transmitter 120 modulates laser light 123 output by the semiconductor laser 121 to signal light 125 on the basis of transmission data 124, and outputs the signal light 125.

The photodiode 331 of the receiver 330 demodulates the signal light 125 transmitted through the optical fiber cable 200 to an electric signal, and outputs the electric signal to the data processing unit 340. The data processing unit 340 transmits data of the electric signal to a node, and also receives data from the node and outputs the data to the modulator 322 as transmission data 324.

The modulator 322 of the transmitter 320 modulates laser light 323 output by the semiconductor laser 321 to signal light 325 on the basis of the transmission data 324, and outputs the signal light 325.

The photodiode 131 of the receiver 130 demodulates the signal light 325 transmitted through the optical fiber cable 200 to an electric signal, and outputs the electric signal. Data of the electric signal is transmitted to a node, whereas data from the node is the transmission data 124.

The feed light 112 and the signal light 125 from the first data communication device 100 are input to one end 201 of the optical fiber cable 200, propagate through the cladding 220 and the core 210, respectively, and are output from the other end 202 of the optical fiber cable 200 to the second data communication device 300.

The signal light 325 from the second data communication device 300 is input to the other end 202 of the optical fiber cable 200, propagates through the core 210, and is output from the one end 201 of the optical fiber cable 200 to the first data communication device 100.

<Optical Element>

Figure 2:
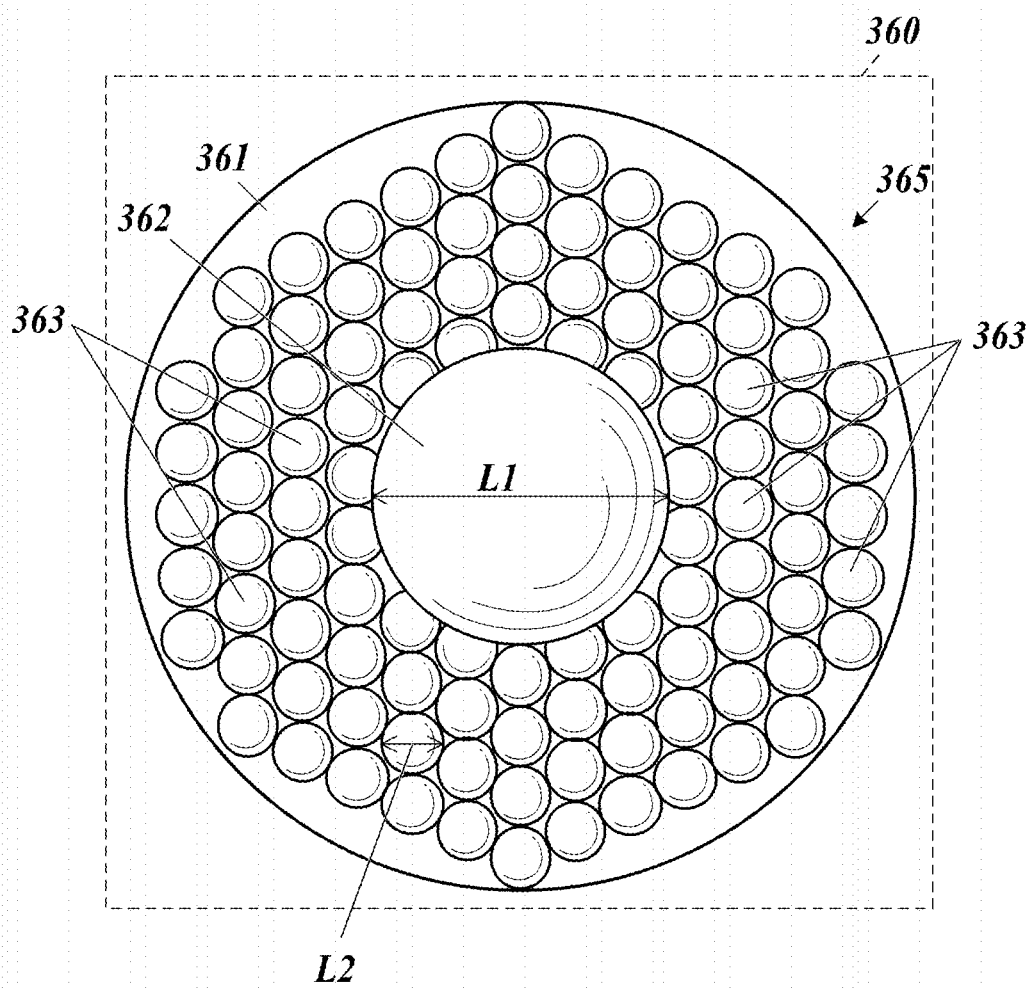
FIG. 2 is a front view of an optical element shown in FIG. 1.
Figure 3:
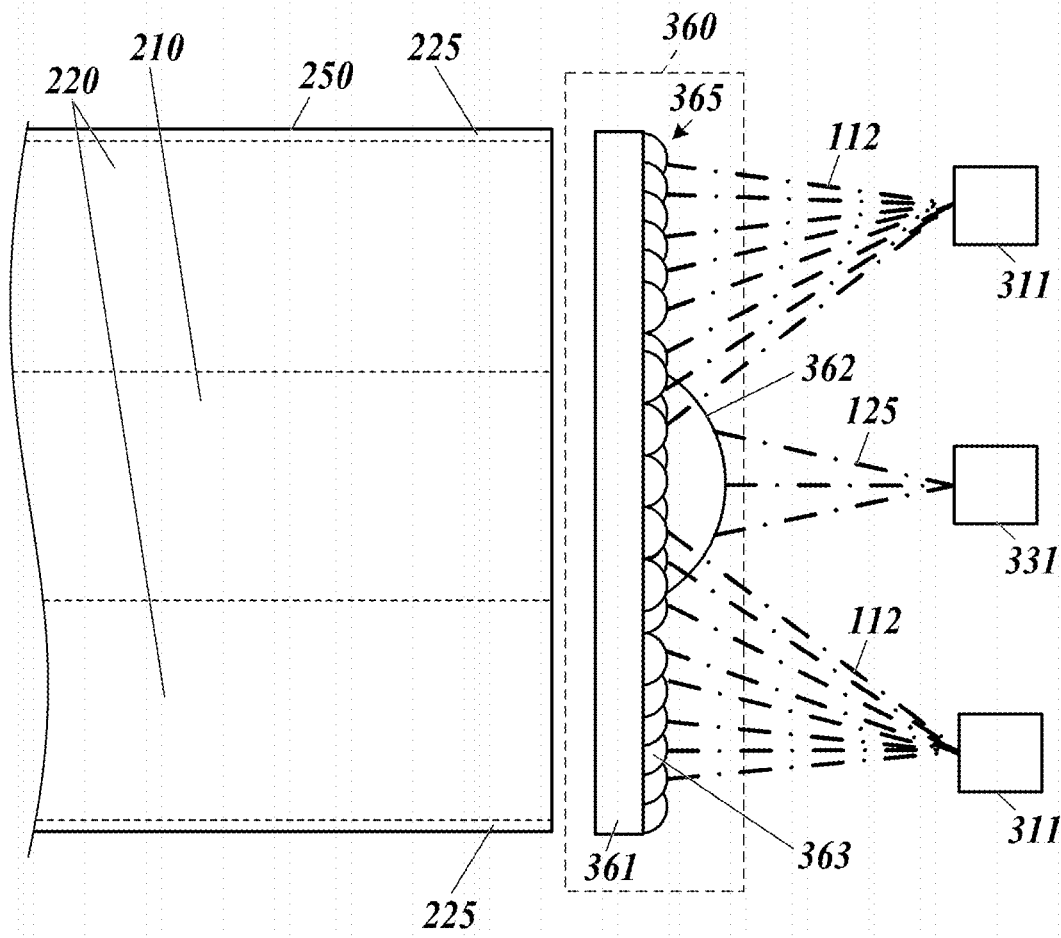
FIG. 3 shows the optical element shown in FIG. 1 and its surroundings.

FIG. 2 is a front view of the optical element shown in FIG. 1. FIG. 3 shows the optical element shown in FIG. 1 and its surroundings. The optical element 360 faces an output end face of the optical fiber 250 and separates the signal light 125 and the feed light 112 output from the optical fiber 250. The optical element 360 includes: a tabular base 361 that allows light to pass through; and a lens assembly 365 including a first condensing lens 362 and a plurality of second condensing lenses 363.

The first condensing lens 362 and the second condensing lenses 363 are each a planoconvex lens having a convex surface on one side and a plane surface that may be united to the base 361. The diameter L2 of each second condensing lens 363 is smaller than the diameter L1 of the first condensing lens 362. The second condensing lenses 363 may all have the diameter L2, or some may have a diameter different therefrom.

The first condensing lens 362 is disposed at a position corresponding to the core 210 of the optical fiber 250. The second condensing lenses 363 are disposed at positions corresponding to the cladding 220. The position corresponding to the core 210 corresponds to a position through which the laser light output from the core 210 propagates. The positions corresponding to the cladding 220 correspond to positions through which the laser light output from the cladding 220 propagates.

The second condensing lenses 363 are closely aligned. For example, the second condensing lenses 363 are arranged in a honeycomb array. The second condensing lenses 363 may each be circular as viewed in the axial direction of the first condensing lens 362. A honeycomb array of circles means an array of circles that are inscribed circles of regular hexagons, assuming that a honeycomb is composed of regular hexagons. This arrangement achieves a configuration in which the second condensing lenses 363 are closely aligned in the radial direction and the circumferential direction with the first condensing lens 362 at the center.

As shown in FIG. 3, the photodiode 331 is disposed at a position in the axial direction of the first condensing lens 362, the position onto which the first condensing lens 362 focuses the signal light 125. The photoelectric conversion element 311 of the powered device 310 is disposed at a position onto which the second condensing lenses 363 focus the feed light 112. There may be a plurality of photoelectric conversion elements 311 dispersedly disposed around the photodiode 331. The axial directions of the respective second condensing lenses 363 may be different from one another depending on their respective positions in the radial direction and the circumferential direction such that the second condensing lenses 363 focus the feed light 112 onto the photoelectric conversion elements 311 that are dispersedly disposed.

A configuration may be adopted in which the signal light 125 separated by the optical element 360 is led to the photodiode 331 through a second optical fiber different from the optical fiber 250. In this case, at the position of the photodiode 331 shown in FIG. 3, an input face of the second optical fiber may be disposed. Similarly, a configuration may be adopted in which the feed light 112 separated by the optical element 360 is led to the photoelectric conversion element(s) 311 through a third optical fiber different from the optical fiber 250. In this case, at the position(s) of the photoelectric conversion element(s) 311 shown in FIG. 3, an input face of the third optical fiber may be disposed.

The first condensing lens 362 and the second condensing lenses 363 can be formed by using, for example, nanoimprint technology. The nanoimprint technology is a technology of pressing a mold formed by inverting protrusions/recesses of a target shape against resin as a molding/forming material, thereby transferring the target shape thereto. The first condensing lens 362 and the second condensing lenses 363 of the optical element 360 may be formed by using various other technologies. Examples thereof include MEMS (Micro Electro Mechanical Systems) processing techniques and metallic molding.

<Actions and Effects of Optical Element>

The feed light 112 and the signal light 125 input from the first data communication device 100 have different wavelengths and propagate through the cladding 220 and the core 210 of the optical fiber 250, respectively. The signal light 125 output from the core 210 of the optical fiber 250 at the other end 202 passes through the first condensing lens 362 of the optical element 360 to be focused onto the photodiode 331. Much of the feed light 112 output from the cladding 220 passes through the second condensing lenses 363 to be focused onto the photoelectric conversion element(s) 311. Part of the feed light 112 passing through gaps between the second condensing lenses 363 is not input to the photoelectric conversion element(s) 311. However, the ratio of the area of the gaps between the second condensing lenses 363 to the area of an end face of the cladding 220 is small. Hence, the ratio of the feed light 112 not to be input to the photoelectric conversion element(s) 311 to the feed light 112 output from the cladding 220 is small. This effectuates highly-efficient optical transmission and highly-efficient photoelectric conversion.

The signal light 325 output from the second data communication device 300 passes through the first condensing lens 362 to be transmitted to the core 210 of the optical fiber 250.

As described above, according to the optical element 360 of this embodiment, the optical element 360 includes the first condensing lens 362 disposed at a position corresponding to the core 210 and the second condensing lenses 363 disposed at positions corresponding to the cladding 220. The first condensing lens 362 and the second condensing lenses 363 can separate the feed light 112 and the signal light 125 with a small loss.

Further, according to the optical element 360 of this embodiment, the diameter of each second condensing lens 363 is smaller than the diameter of the first condensing lens 362. This enables dense arrangement of the second condensing lenses 363 and can further reduce the loss of the feed light 112.

Further, according to the optical element 360 of this embodiment, the second condensing lenses 363 are more densely disposed, for example, in a honeycomb array. This further reduces the loss of the feed light 112.

Further, according to the optical element 360 of this embodiment, the optical element 360 includes the lens assembly 365 including: the base 361; and the first condensing lens 362 and the second condensing lenses 363 united to the base 361. This improves ease of handling of the optical element 360.

According to the power over fiber system 1 of this embodiment, the optical element 360 providing the above-described effects faces the output end face of the optical fiber 250. This can effectuate highly-efficient transmission of the signal light 125 and the feed light 112.

(Modification)

Figure 4:
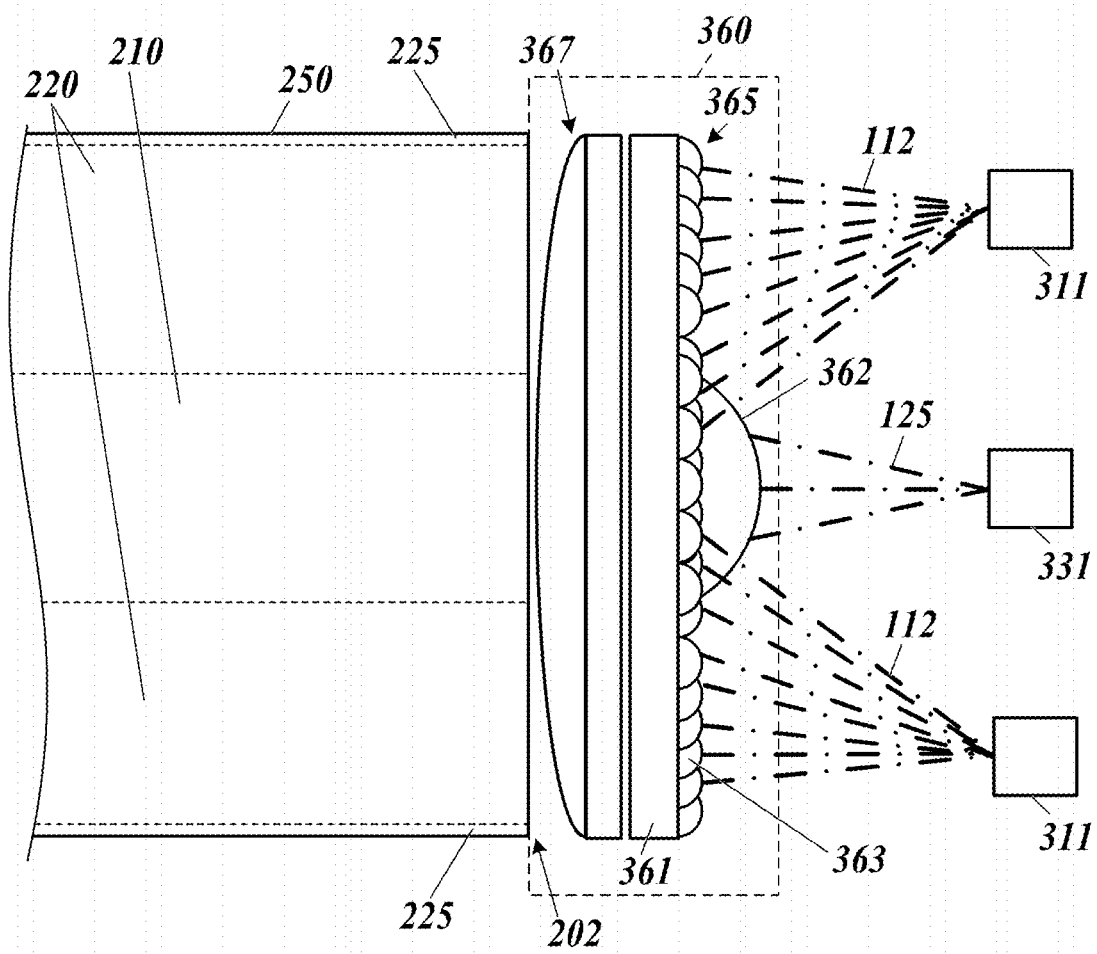
FIG. 4 shows a modification of the optical element.

FIG. 4 shows a modification of the optical element. The optical element 360 may include the lens assembly 365 and an optical-fiber-side optical element 367 disposed at a side of the lens assembly 365 closer to the optical fiber 250.

The optical-fiber-side optical element 367 has functions of a refractive index adjustment part, an anti-reflection part or both. The function as the refractive index adjustment part may be achieved, for example, by a biconvex lens, a planoconvex lens, a Fournel lens, an aspheric lens, a plane lens or the like that adjusts the spread angle of the laser light that is output from the output end face of the optical fiber 250. The function as the anti-reflection part may be achieved by an anti-reflection coating. Alternatively, the function as the anti-reflection part may be achieved by the input end face of the optical-fiber-side optical element 367 and the output end face of the optical fiber 250 with inclinations in the same direction formed.

In FIG. 4, the optical-fiber-side optical element 367 and the lens assembly 365 are separate components, but may be integrated.

As described above, according to the optical element 360 of this modification, the optical-fiber-side optical element 367 having the function as the refractive index adjustment part, the function as the anti-reflection part or both can further improve the transmission efficiency of the signal light 125 and the feed light 112.

Although one or more embodiments of the present disclosure have been described above, the present invention is not limited to these embodiments. For example, in the above embodiment(s), the first condensing lens and the second condensing lenses are planoconvex lenses, but may be various other lenses that provide the focusing effect. Examples thereof include biconvex lenses and meniscus lenses. The second condensing lenses are not limited to being circular as viewed in their axial directions, but may have another shape. For example, they may be hexagonal. Further, in the above embodiment(s), the first condensing lens and the second condensing lenses are united to the tabular base, but various other support structures may be applied. Examples thereof include a structure in which the edges of the first condensing lens and the second condensing lenses are bonded so that they support one another and are fixed to one another. The details described in the embodiment(s) may be appropriately modified within a range not departing from the scope of the invention.

INDUSTRIAL APPLICABILITY

The present invention is applicable to an optical element and an optical transmission system.

REFERENCE SIGNS LIST

1 Power over Fiber System (Optical Transmission System)
100 First Data Communication Device
110 Power Sourcing Equipment
111 Semiconductor Laser for Power Supply
112 Feed Light
120 Transmitter
125 Signal Light
130 Receiver
200 Optical Fiber Cable 210 Core
220 Cladding (First Cladding)
225 Outer Cladding (Second Cladding)
250 Optical Fiber
300 Second Data Communication Device
310 Powered Device
311 Photoelectric Conversion Element
320 Transmitter
325 Signal Light
330 Receiver
331 Photodiode for Signals
360 Optical Element
361 Base
362 First Condensing Lens
363 Second Condensing Lens
365 Lens Assembly
367 Optical-fiber-side Optical Element (Refractive Index Adjustment Part, Anti-reflection Part)

The invention claimed is:

1. An optical element comprising:
a first condensing lens; and
a plurality of second condensing lenses,
wherein the optical element is disposed so as to face an end of an optical fiber including a core, a first cladding located around the core, and a second cladding located around the first cladding,
wherein the first condensing lens is disposed at a position corresponding to the core, and
wherein the second condensing lenses are disposed around the first condensing lens at positions corresponding to the first cladding.

2. The optical element according to claim 1, wherein each of the second condensing lenses has a diameter that is smaller than a diameter of the first condensing lens.

3. The optical element according to claim 1, wherein the second condensing lenses are closely aligned.

4. The optical element according to claim 1 further comprising a tabular base that allows light to pass through,
wherein the first condensing lens and the second condensing lenses are each a planoconvex lens having a convex surface on one side, and
wherein the first condensing lens and the second condensing lenses are united to the base.

5. The optical element according to claim 1 further comprising a refractive index adjustment part, an anti-reflection part or both thereof disposed at a side of a lens assembly including the first condensing lens and the second condensing lenses, the side being closer to the optical fiber.

6. An optical transmission system comprising:
an optical fiber including a core, a first cladding located around the core, and a second cladding located around the first cladding, the optical fiber configured to transmit signal light and feed light therethrough; and
an optical element facing an output end of the optical fiber,
wherein
the optical element includes:
a first condensing lens; and
a plurality of second condensing lenses,
the first condensing lens is disposed at a position corresponding to the core, and
the second condensing lenses are disposed around the first condensing lens at positions corresponding to the first cladding.

7. The optical element according to claim 1, wherein
each of the second condensing lenses has a diameter that is smaller than a diameter of the first condensing lens, and
the first condensing lens and the plurality of second condensing lenses are disposed on a same plane perpendicular to an axial direction of the optical fiber.

8. The optical transmission system according to claim 6, wherein
each of the second condensing lenses has a diameter that is smaller than a diameter of the first condensing lens, and
the first condensing lens and the plurality of second condensing lenses are disposed on a same plane perpendicular to an axial direction of the optical fiber.

* * * * *